(12) United States Patent
Huang et al.

(10) Patent No.: US 10,780,394 B2
(45) Date of Patent: Sep. 22, 2020

(54) COMPOSITIONS AND METHODS FOR REMOVING AIR POLLUTANTS

(71) Applicant: Honeywell International Inc., Morris Plains, NJ (US)

(72) Inventors: Kai Huang, Shanghai (CN); Marilyn Wang, Shanghai (CN); Xingping Wang, Shanghai (CN); Hailin Liu, Shanghai (CN); Wesley Nie, Shanghai (CN); Jack Yu, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 144 days.

(21) Appl. No.: 15/811,076

(22) Filed: Nov. 13, 2017

(65) Prior Publication Data

US 2019/0143267 A1     May 16, 2019

(51) Int. Cl.

| | |
|---|---|
| *C12P 13/12* | (2006.01) |
| *B01D 53/84* | (2006.01) |
| *C08L 71/02* | (2006.01) |
| *C01C 1/24* | (2006.01) |
| *C01G 23/04* | (2006.01) |
| *C08K 3/22* | (2006.01) |
| *C08K 5/00* | (2006.01) |
| *C08K 3/10* | (2018.01) |
| *C08K 3/014* | (2018.01) |
| *C08K 5/13* | (2006.01) |
| *C08K 3/30* | (2006.01) |

(52) U.S. Cl.
CPC .............. *B01D 53/84* (2013.01); *C01C 1/24* (2013.01); *C01G 23/04* (2013.01); *C08K 3/014* (2018.01); *C08K 3/10* (2013.01); *C08K 3/22* (2013.01); *C08K 5/00* (2013.01); *C08K 5/005* (2013.01); *C08L 71/02* (2013.01); *C12Y 402/02* (2013.01); *B01D 2257/708* (2013.01); *B01D 2259/45* (2013.01); *C08G 2650/58* (2013.01); *C08K 3/30* (2013.01); *C08K 5/13* (2013.01); *C08K 2003/2241* (2013.01)

(58) Field of Classification Search
None
See application file for complete search history.

(56) References Cited

PUBLICATIONS

Pauldas et al. (International J. of Pharmacy & Biol. Sci., vol. 8, issue 3, 2018, pp. 946-958).*
Bruhlmann et al. (Applied & Environmental Microbiol, Jun. 1994, pp. 2107-2112).*
Umar et al. (INTECH, Photocatalytic Degradation of Organic Pollutants in Water, chapter 8, 2013, pp. 195-208).*
Singh et al. (J. of Cleaner Production, vol. 196, 2018, pp. 1669-1680).*

* cited by examiner

*Primary Examiner* — Hope A Robinson
(74) *Attorney, Agent, or Firm* — Schwegman Lundberg & Woessner, P.A.

(57) ABSTRACT

Compositions for removing air pollutants from the air are provided. These compositions can be sprayed on a variety of surfaces to remove air pollutants such as volatile organic compounds (VOCs) from the environment, and are suitable for use in human dwellings.

19 Claims, No Drawings

COMPOSITIONS AND METHODS FOR REMOVING AIR POLLUTANTS

BACKGROUND

Rapid economic development in many countries has resulted in increased environmental pollution. In particular, indoor environmental pollution caused by the use of various chemicals associated with the production of items such as decorative materials, furniture, tobacco, and household appliances is of growing concern. Many of the appliances, furnishings, and painted surfaces found in new home constructions release volatile organic compounds (VOCs). VOCs include hydrocarbons, carbonyl compounds, organic acids, organic peroxides, organic sulfur compounds, organic halides, and the like. VOCs can also participate in photochemical reaction with nitrogen oxides and sulfides of the atmosphere upon exposure to light and form highly toxic photochemical smog.

Many VOCs have been found to be carcinogenic or suspected carcinogens (such as formaldehyde, benzene, tetrachlorethylene, trichloroethane, trichlorethylene, and the like). Major emission sources of indoor air VOCs include wall coatings (e.g., paint and wallpaper) and oil paints and varnishes for furniture. However, recently, houses have become more and more airtight and, accordingly, VOCs can result in more serious health issues because they cannot rapidly escape the indoor environment.

There are a variety of commercial air fresheners and deodorants that can temporarily mask the odor of some VOCs, but they do not fundamentally eliminate harmful sources of pollution, and can themselves act as new secondary pollution sources. Of the many VOC pollutants, there is widespread concern regarding the effective control of formaldehyde in paints and adhesives. Some commercially available products for formaldehyde removal are available; however, there is no effective product for removal of VOCs in general.

SUMMARY OF THE INVENTION

In various embodiments, a composition for removing one or more air pollutants from air includes at least one plant-derived substance reactive with at least one air pollutant, at least one dispersant, and water.

In various embodiments, a composition for removing air pollutants includes a plant pectinase in an amount of about 1 to about 5 wt % of the composition, sodium carboxymethyl cellulose in an amount of about 1 to about 10 wt % of the composition, hemicellulose in an amount of about 1 to about 10 wt % of the composition, and water.

In various embodiments, a composition for removing air pollutants includes a tea polyphenol in an amount of about 1 to about 5 wt % of the composition, polyethylene oxide-propylene oxide in an amount of about 1 to about 10 wt of the composition, nano-titania in an amount of about 1 to about 10 wt % of the composition, ammonium sulfate in an amount of about 1 to about 10 wt % of the composition, and water.

Advantageously, various embodiments of the compositions of the present invention can effectively remove a variety of VOCs from the air using naturally occurring plant enzymes or compounds obtained from plants, and without the use of harsh or toxic chemicals. Moreover, various embodiments of the composition of the present invention may be safe enough to spray directly onto any household surface, such as curtains, carpet, floors, furniture or walls.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Compositions for Removing Air Pollutants

In various embodiments, a composition for reproving one or more air pollutants from air includes at least one plant-derived substance reactive with at least one air pollutant, at least one dispersant, and water. The composition can remove air pollutants from a variety of indoor environments, including homes, apartments, hospitals, vehicles, child care centers, retail spaces, and factories. The water in the composition can include deionized water.

The air pollutants can include at least one volatile organic compound. Volatile organic compounds (VOCs) can include formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxylethyl acetate, nitrobenzene, bis-(2-methyoxyethyl)ether, 1,3,5-trimethylbenzene, and mixtures thereof. In various embodiments, the volatile organic compound is formaldehyde.

In various embodiments, the plant-derived substance includes cellulose or at least one plant enzyme. A plant enzyme can be any naturally occurring enzyme found in plants, fungi, lichens, or algae. The plant enzyme can also include biochemically modified versions of any of the foregoing plant enzymes. Suitable plant enzyme can include a plant laccase, hemicellulase, oxidoreductase, protease, lipase, 1,4-β-D-glucan glucanohydrolase, endo-1,4-β-D-glucanase, 1,4-β-D-glucan cellobiohydrolase, exo-1,4-β-D-glucanase, 1,4-β-glucosidase, pectinase, and mixtures thereof.

In various embodiments, the plant enzyme is pectinase. Plant enzymes can be obtained from commercial sources or by extraction from plant material. Extraction of plant enzymes from plant material can include lyophilization of the plant material, followed by extraction with a suitable extraction buffer and centrifugation. Pectinases can include pectinesterases, polymethylgalacturonases, polymethylegalacturonate lyases (PMGL), and protopectinases. The pectinase can come from any suitable source described herein.

In various embodiments, the plant enzyme can be about 1 to 30 wt % of the composition. The plant enzyme can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the composition. The plant enzyme can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt % of the composition, or any range or sub-range between any of these values. In various embodiments, the plant enzyme is about 1 to about 5 wt % of the composition.

In various embodiments, the dispersant can be sodium dioctyl succinate, sodium linear alkyl benzene sulfonate, sodium linear alkyl sulfate, fatty alcohol polyoxyethylene ether sulfate, fatty alcohol polyoxyethylene ether sulfuric acid ammonium, lauryl alcohol sulfate, nonylphenol ethoxylate, lignin sulfonate, heavy alkyl benzene sulfonate, alkyl polyether, polyvinylpyrrolidone, fatty alcohol polyoxyethylene ether, sodium polyacrylate, polymaleamide, polymaleic acid, polymaleic anhydride, polyacrylamide, polyethylene oxide-propylene oxide, sodium carboxymethyl cellulose, or hemicellulose. The composition can also include mixtures of any of the foregoing dispersants. In various embodiments, the dispersant can be sodium carboxymethyl cellulose and hemicellulose.

In various embodiments, the amount of the one or more dispersants can about 0.01 to about 10 wt % of the composition. The amount of one or more dispersants can be about 0.1 to 10 wt %, 0.5 to 10 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, 1 to 2 wt is of the composition, or any range or sub-range between these values. The amount of one or more dispersants can be 0.01 wt %, 0.25 wt %, 0.5 wt %, 0.75 wt %, 1 wt %, 2 wt %, 3 wt %, 4 wt %, 5 wt %, 6 wt %, 7 wt %, 8 wt %, 9 wt %, 10 wt % of the composition, or any range or sub-range between any of these values. In various embodiments, the amount of the one or more dispersants is about 0.5 to about 5 wt % of the composition.

In various embodiments, the at least one plant derived substance is a plant polyphenol. The plant polyphenol can be any naturally occurring substance that contains two or more phenolic groups (hydroxyl groups on an aromatic ring). The plant polyphenol can also be a naturally occurring plant polyphenol that has been chemically modified.

In various embodiments, the plant polyphenol is chosen from tannins, lignins, flavonoids, tea polyphenol, phenolic compounds, carvacrol, eugenol, and mixtures thereof. In various embodiments, the polyphenol is tea polyphenol. Suitable tea polyphenol and phenolic compounds can include epigallocatechin-3-gallate, epicatechin, epicatechin-3-gallate, epigallocatechin, gallocatechin, theaflavin, theaflavin-3-gallate, and combinations thereof. Table 1 shows the chemical structures of some suitable polyphenols.

TABLE 1

Structures of some tea polyphenols suitable for use in the composition.

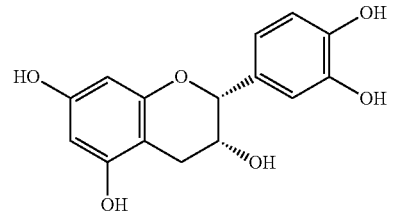

(−)-epicatechin

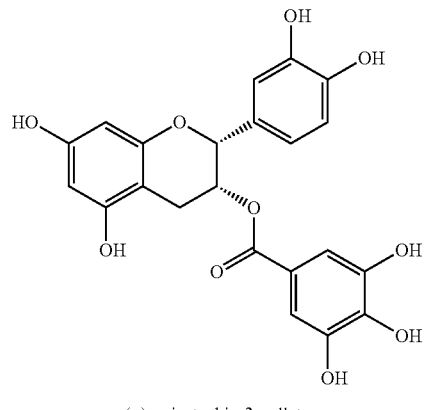

(−)-epicatechin-3-gallate

TABLE 1-continued

Structures of some tea polyphenols suitable for use in the composition.

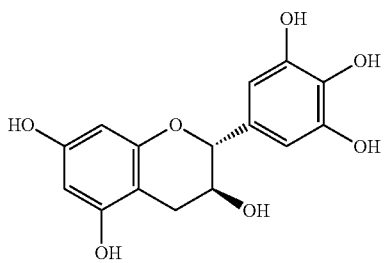

(+)-gallocatechin

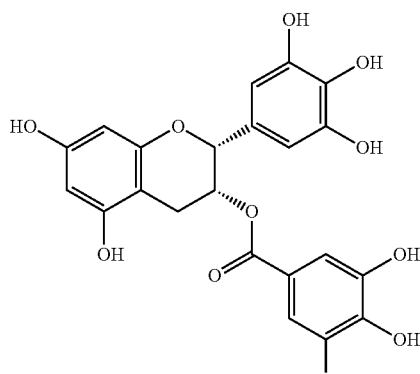

(−)-epigallocatechin-3-gallate

In various embodiments, the polyphenol is present in an amount of about 1 to about 30 wt % of the composition. The polyphenol can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the composition. The polyphenol can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wa, 5 wt %, 4 wt %, 3 wt %, 2 wt %, 1 wt % of the composition, or any range or sub-range between any of these values.

In various embodiments, the air purifying composition further includes at least one photocatalyst. In various embodiments, the air purifying composition further includes at least one chemical scavenger. The air purifying composition, in various embodiments, can further include at least one photocatalyst and at least one chemical scavenger. The photocatalyst can be a nanomaterial chosen from titania, zinc oxide, tin oxide, silver anatase, titanium dioxide, zirconium phosphate, silver zirconium phosphate, tungsten trioxide, manganese dioxide, and combinations thereof. In various embodiments, the photocatalyst is nano-titania.

Suitable photocatalysts include nanomaterials with an average particle size, as measured by the largest dimension of the particle, of about 5 nm to about 500 nm. In various embodiments, the nanomaterial has a particle size of about 5 nm to 450 nm, 5 nm to 400 nm, 5 nm to 350 nm, 5 nm to 300 nm, 5 nm to 250 nm, 5 nm to 200 nm, 5 nm to 150 nm, 5 nm to 100 nm, 5 nm to 90 nm, 5 nm to 80 nm, 5 nm to 70 nm, 5 nm to 60 nm, 5 nm to 50 nm, 5 nm to 40 nm, 5 nm to 30 nm, 5 nm to 20 nm, 5 nm to 10 nm, or any range or sub-range between these values. The photocatalyst can include nanomaterials having an average particle size of about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 150 nm, 200 nm, 250 nm, 300 nm, 350 nm, 400 nm, 450 nm, 500 nm, or any range or sub-range between these values.

Particle sizes can be determined by any suitable technique, including laser diffraction, dynamic light scattering, sedimentation, image analysis, and acoustic spectroscopy.

In various embodiments, the chemical scavenger reacts with an aldehyde or ketone functional group in the air pollutant. The type of chemical reaction with the air pollutant depends on the chemical structure of the chemical scavenger, and without being bound by theory, can include, but is not limited to, a reduction, an alkylation, a reductive amination, a nucleophilic substitution, or combinations of these reactions. Scheme 1 shows one mechanism for the reaction of formaldehyde with a polyphenol; however, the exact mechanism will depend on the structure of the polyphenol and the structure of the VOC air pollutant.

Scheme 1. A reaction mechanism for the reaction of a polyphenol with formaldehyde.

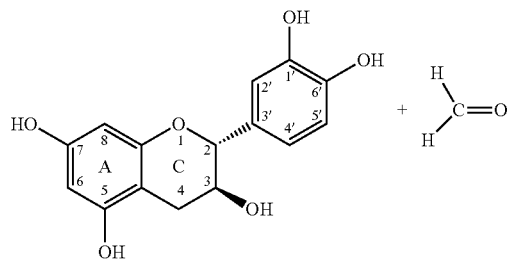

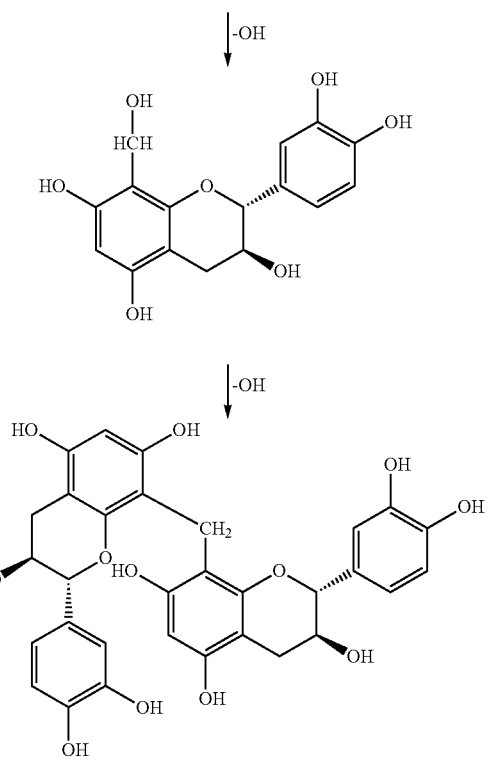

In various embodiments, the chemical scavenger can be chosen from a semicarbazide, hydrazine, phenylhydrazine, ammonium sulfate, D-glucosamine hydrochloride, tromethamine, taurine, alanine, glutamic acid, 2-imidazolidinone, adipic acid dihydrazide, p-toluenesulfonyl hydrazide, 1,3-diaminourea, 3,6-dihydroxypyridazine, tris(2-hydroxyethyl) amine, triethylenediamine, and mixtures thereof. In various embodiments, the chemical scavenger is ammonium sulfate.

In various embodiments, the photocatalyst is present in an amount of about 1 to about 30 wt % of the composition. The photocatalyst can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the composition. In various embodiments, the photocatalyst can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt % of the composition, or any range or sub-range between any of these values.

In various embodiments, the chemical scavenger is present in an amount of about 1 to about 30 wt % of the composition. The chemical scavenger can be about 1 to 25 wt %, 1 to 20 wt %, 1 to 15 wt %, 1 to 10 wt %, 1 to 9 wt %, 1 to 8 wt %, 1 to 7 wt %, 1 to 6 wt %, 1 to 5 wt %, 1 to 4 wt %, 1 to 3 wt %, or 1 to 2 wt % of the composition. In various embodiments, the chemical scavenger can be about 30 wt %, 25 wt %, 20 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt % of the composition, or any range or sub-range between any of these values.

In various embodiments, a composition for removing air pollutants includes a plant pectinase in an amount of about 1 to about 5 wt % of the composition, sodium carboxymethyl cellulose in an amount of about 1 to about 10 wt % of the composition, hemicellulose in an amount of about 1 to about 10 wt % of the composition, and water.

In various embodiments, a composition for removing air pollutants includes a tea polyphenol in an amount of about 1 to about 5 wt % of the composition, polyethylene oxide-propylene oxide in an amount of about 1 to about 10 wt of the composition, nano-titania in an amount of about 1 to about 10 wt % of the composition, ammonium sulfate in an amount of about 1 to about 10 wt % of the composition, and water.

Method for Removing Air Pollutants

In various embodiments, a method of removing one or more air pollutants from air includes contacting the composition with air. Contacting the composition with air can include both allowing air to passively pass over the composition as well as actively passing air over the composition. Actively passing air over the composition can include any suitable method for moving air, such as a fan or blower. Contacting the composition with air can also include distribution of the composition in the air or on a surface, by means such as misting or spraying the composition.

In various embodiments, the method further includes spraying the composition on a surface. Suitable surfaces can include wood, plastic, stone, glass, metal, fabric, polymer coating, or combinations thereof. In various embodiments, an apparatus for removing one or more air pollutants from air, includes an apparatus comprising the composition described herein.

Methods for Measuring Rate of Air Pollutant Removal

In various embodiments, a method for determining the rate of removal of one or more air pollutants from air includes comparing the time taken for a test chamber to reach a predetermined concentration of the one or more air pollutants in the absence of an air pollutant absorber and the time taken for a test chamber to reach a predetermined concentration of the one or more air pollutants in the presence of the composition.

Determining the rate of removal of air pollutants is important because it allows for the comparison of the effectiveness of different pollutant removal products and compositions. The industry standard test method, JC/T 1074-2008, measures the purification ability of air purifying coatings. However, the measurements obtained using the standard test method and the actual performance of the product do not correlate very well.

EXAMPLES

Various embodiments of the present invention can be better understood by reference to the following Examples which are offered by way of illustration. The present invention is not limited to the Examples given herein.

Preparation of Air Purifying Composition Containing a Plant Enzyme

Sodium carboxymethyl cellulose (20 g, 2 wt %) was added to deionized water (930 mL, 93 wt %) and mixed well, then hemicellulose (20 g, 2 wt %) and pectinase (30 g, 3 wt %) were added in to prepare an aqueous formaldehyde scavenger solution, where the wt % listed in this example is relative to the weight of the final composition. This aqueous formaldehyde scavenger solution can be sprayed on any desired surface, such as wood furniture.

Preparation of Air Purifying Composition Containing a Plant Polyphenol

Polyethylene oxide-propylene oxide (20 g, PEG-PPG-PEG, Pluronic® P-123, average $M_n$~5800, Sigma-Aldrich, 2 wt %) was added to deionized water (900 mL, 90 wt %) and mixed well, then tea polyphenol (30 g, >95% HPLC purity, Xi'an ShuangDe Biological Technology Co., Ltd, 3 wt %), nano-titania (AEROXIDE P25, 30 g, 3 wt %) and ammonium sulfate (20 g, Sigma-Aldrich, 2 wt %) were added to prepare an aqueous VOC scavenger solution, where the wt % listed in this example is relative to the weight of the final composition. This aqueous VOC scavenger solution can be sprayed on any desired surface, such as wood furniture.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Example 2. Measuring the Rate of Air Pollutant Removal

The standard test method, JC/T 1074-2008, can be conducted as follows using formaldehyde as example air pollutant: four pieces of glass (measuring 50 cm×50 cm) are placed in a 1 m³ test cabin. The glass surfaces are coated with products to be tested, a certain amount of formaldehyde is injected into the test chamber, and the change of formaldehyde concentration is recorded to evaluate the performance of each product.

However, the standard test method can only show a products' removal ability for free formaldehyde in a certain space. Free formaldehyde in a real room is only a small part of the air pollutant problem. In a real-world scenario, formaldehyde will be continuously released from sources of pollution, such as furniture, which is not measurable by the standard method.

An improved and more accurate test method was performed using the following procedure: a 3 m³ test chamber was equipped with rubber gloves that allow for access of the interior of the test chamber without disturbing the atmosphere therein is provided. The interior of the test chamber was at a temperature of 25±2° C. and a humidity of 50±10%. A test solution containing 1% formaldehyde in deionized water was prepared. A 10 mL aliquot of the test solution was spread evenly over a 50 cm×50 cm gypsum board. The gypsum board and a PPM formaldehyde tester, such as the PPM-400ST meter, were placed in the test chamber. Without being bound by theory, the porous nature of the gypsum board can result in gradual emission of pollutants such as formaldehyde, which more closely mimics the emission of pollutants from actual home environments and from any of the sources, such as furniture, mentioned herein.

The formaldehyde concentration is tested with PPM formaldehyde tester, and when the formaldehyde concentration reaches 1 ppm (parts per million), the time $t_0$ is 0, and the concentration is $c_0$. A 5 mL aliquot of the product to be tested was sprayed on the gypsum surface using a sprayer manipulated by rubber gloves and the change of formaldehyde concentration was recorded with the PPM formaldehyde tester.

At the lowest formaldehyde concentration, the time was recorded as $t_1$ and the formaldehyde concentration is recorded as $c_1$. The formaldehyde concentration was continuously measured until the concentration returns to 1 ppm or the maximum value, was reached if the concentration could not return to 1 ppm. The time was recorded as $t_2$ and concentration reached is $c_2$.

The removal rate, $r_1$, is calculated using the formula $r_1=(c_0-c_1)/(t_1-t_0)$. The lasting rate, $r_2$, is calculated using the formula $r_2=(c_2-c_1)/(t_2-t_1)$. The removal rate indicates the ability of the product to remove formaldehyde in a short period, and the lasting rate indicates the ability of the product to remove formaldehyde over a prolonged period.

TABLE 1

Comparative Test Data

| Standard Method (JC/T 1074-2008) | | New Method | | Newly Decorated Home (GB 50325-2010) | |
| --- | --- | --- | --- | --- | --- |
| Time(h) | C(HCHO) | Time(h) | C(HCHO) | Time(h) | C(HCHO) |
| 0 | 1 ppm | 0 | 1 ppm | 0 | 0.44 ppm |
| 24 | 0.1 ppm | 3 | 0.3 ppm | 24 | 0.08 ppm |
| | | 12 | 1 ppm | 48 | 0.21 ppm |

Table 1 shows that the standard method is unable to measure the concentration of formaldehyde that is continuously released. For Table 1, $r_1$ is 0.23 and $r_2$ is 0.78. After 24 hours, the standard method measured the formaldehyde concentration at 0.1 ppm, so that over a 24 hour period the formaldehyde concentration appeared to decline. Under a real world scenario, such as a newly decorated house measured with the standard GB 50325-2010 method, the formaldehyde level can dip to a concentration below the initial concertation (at 24 hours), then increase to a higher concentration (48 hours). The new method, as show in Table 1, is also able to capture a dip in formaldehyde concentration (at 3 hours) and the subsequent increase (at 12 hours) the concentration of formaldehyde, which the JC/T 1074-2008 method is unable to do.

ENUMERATED EMBODIMENTS

The following exemplary embodiments are provided, the numbering of which is not to be construed as designating levels of importance:

Embodiment 1 provides a composition for removing one or more air pollutants from air, comprising at least one plant-derived substance reactive with at least one air pollutant; at least one dispersant; and water.

Embodiment 2 provides the composition of embodiment 1, wherein the air pollutants comprise at least one volatile organic compound.

Embodiment 3 provides the composition of any one of embodiments 1-2, wherein the volatile organic compound is formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxylethyl acetate, nitrobenzene, bis-(2-methyoxyethyl)ether, 1,3,5-trimethylbenzene, and mixtures thereof.

Embodiment 4 provides the composition of any one of embodiments 1-3, wherein the volatile organic compound is formaldehyde.

Embodiment 5 provides the composition of any one of embodiments 1-4, wherein the plant-derived substance comprises at least one plant enzyme.

Embodiment 6 provides the composition of any one of embodiments 1-5, wherein the plant enzyme is a plant laccase, hemicellulase, oxidoreductase, protease, lipase, cellulose, 1,4-β-D-glucan glucanohydrolase, endo-1,4-β-D-glucanase, 1,4-β-D-glucan cellobiohydrolase, exo-1,4-β-D-glucanase, 1,4-β-glucosidase, pectinase, and mixtures thereof.

Embodiment 7 provides the composition of any one of embodiments 1-6, wherein the plant enzyme is pectinase.

Embodiment 8 provides the composition of any one of embodiments 1-7, wherein the plant enzyme is about 1 to about 30 wt % of the composition.

Embodiment 9 provides the composition of any one of embodiments 1-8, wherein the plant enzyme is about 1 to about 5 wt % of the composition.

Embodiment 10 provides the composition of any one of embodiments 1-9, wherein the dispersant is sodium dioctyl succinate, sodium linear alkyl benzene sulfonate, sodium linear alkyl sulfate, fatty alcohol polyoxyethylene ether sulfate, fatty alcohol polyoxyethylene ether sulfuric acid ammonium, lauryl alcohol sulfate, nonylphenol ethoxylate, lignin sulfonate, heavy alkyl benzene sulfonate, alkyl polyether, polyvinylpyrrolidone, fatty alcohol polyoxyethylene ether, sodium polyacrylate, polymaleamide, polymaleic acid, polymaleic anhydride, polyacrylamide, polyethylene oxide-propylene oxide, sodium carboxymethyl cellulose, hemicellulose, and mixtures thereof.

Embodiment 11 provides the composition of any one of embodiments 1-10, wherein the dispersant comprises sodium carboxymethyl cellulose and hemicellulose.

Embodiment 12 provides the composition of any one of embodiments 1-11, wherein the amount of the one or more dispersants is about 0.01 to about 10 wt % of the composition.

Embodiment 13 provides the composition of any one of embodiments 1-12, wherein the amount of the one or more dispersants is about 0.5 to about 5 wt % of the composition.

Embodiment 14 provides the composition of any one of embodiments 1-13, wherein the at least one plant derived substance is a plant polyphenol.

Embodiment 15 provides the composition of any one of embodiments 1-14, wherein the plant polyphenol is chosen from tannins, lignins, flavonoids, tea polyphenol, phenolic compounds, carvacrol, eugenol, and mixtures thereof.

Embodiment 16 provides the composition of any one of embodiments 1-15, wherein the polyphenol is present in an amount of about 1 to about 30 wt % of the composition.

Embodiment 17 provides the composition of any one of embodiments 1-16, further comprising at least one photocatalyst and at least one chemical scavenger.

Embodiment 18 provides the composition of any one of embodiments 1-17, wherein the photocatalyst is a nanomaterial chosen from titania, zinc oxide, tin oxide, silver anatase, titanium dioxide, zirconium phosphate, silver zirconium phosphate, tungsten trioxide, manganese dioxide, and combinations thereof.

Embodiment 19 provides the composition of any one of embodiments 1-18, wherein the chemical scavenger reacts with an aldehyde or ketone functional group in the air pollutant.

Embodiment 20 provides the composition of any one of embodiments 1-19, wherein the chemical scavenger is chosen from semicarbazide, hydrazine, phenylhydrazine, ammonium sulfate, D-glucosamine hydrochloride, tromethamine, taurine, alanine, glutamic acid, 2-imidazolidinone, adipic acid dihydrazide, p-toluenesulfonyl hydrazide, 1,3-diaminourea, 3,6-dihydroxypyridazine, tris(2-hydroxyethyl)amine, triethylenediamine, and mixtures thereof.

Embodiment 21 provides the composition of any one of embodiments 1-20, wherein the photocatalyst is present in an amount of about 1 to about 30 wt % of the composition.

Embodiment 22 provides the composition of any one of embodiments 1-21, wherein the chemical scavenger is present in an amount of about 1 to about 30 wt % of the composition.

Embodiment 23 provides the composition of any one of embodiments 1-22, wherein the polyphenol is a tea polyphenol.

Embodiment 24 provides the composition of any one of embodiments 1-23, wherein the photocatalyst is nano-titania.

Embodiment 25 provides the composition of any one of embodiments 1-24, wherein the chemical scavenger is ammonium sulfate.

Embodiment 26 provides a composition for removing air pollutants, comprising: a plant pectinase in an amount of about 1 to about 5 wt % of the composition; sodium carboxymethyl cellulose in an amount of about 1 to about 10 wt % of the composition; hemicellulose in an amount of about 1 to about 10 wt % of the composition; and water.

Embodiment 27 provides a composition for removing air pollutants, comprising: a tea polyphenol in an amount of about 1 to about 5 wt % of the composition; polyethylene oxide-propylene oxide in an amount of about 1 to about 10 wt % of the composition; nano-titania in an amount of about 1 to about 10 wt % of the composition; ammonium sulfate in an amount of about 1 to about 10 wt % of the composition; and water.

Embodiment 28 provides a method of removing one or more air pollutants from air, comprising: contacting the composition of embodiments 1-27 with air.

Embodiment 29 provides the method of embodiment 28, wherein the method further comprises spraying the composition on a surface.

Embodiment 30 provides the method of any one of embodiments 28-29, wherein the surface comprises wood, plastic, stone, glass, metal, fabric, polymer coating, or combinations thereof.

Embodiment 31 provides an apparatus for removing one or more air pollutants from air, the device comprising the composition of embodiments 1-27.

Embodiment 32 provides a method for determining the rate of removal of one or more air pollutants from air, comprising: comparing the time taken for a test chamber to reach a predetermined concentration of the one or more air pollutants in the absence of an air pollutant absorber and the time taken for a test chamber to reach a predetermined concentration of the one or more air pollutants in the presence of the composition of embodiments 1-27.

What is claimed is:

1. A composition for removing one or more air pollutants from air, comprising:
   at least one plant-derived substance reactive with at least one air pollutant, the plant-derived substance selected from the group consisting of a plant laccase, hemicellulase, oxidoreductase, protease, lipase, cellulose, 1,4-β-D-glucan glucanohydrolase, endo-1,4-β-D-glucanase, 1,4-β-D-glucan cellobiohydrolase, exo-1,4-β-D-glucanase, 1,4-β-glucosidase, pectinase, and mixtures thereof;
   at least one dispersant selected from the group consisting of sodium dioctyl succinate, sodium linear alkyl benzene sulfonate, sodium linear alkyl sulfate, fatty alcohol polyoxyethylene ether sulfate, fatty alcohol polyoxyethylene ether sulfuric acid ammonium, lauryl alcohol sulfate, nonylphenol ethoxylate, lignin sulfonate, heavy alkyl benzene sulfonate, alkyl polyether, polyvinylpyrrolidone, fatty alcohol polyoxyethylene ether, sodium polyacrylate, polymaleamide, polymaleic acid, polymaleic anhydride, polyacrylamide, polyethylene oxide-propylene oxide, sodium carboxymethyl cellulose, hemicellulose, and mixtures thereof; and
   water;
   wherein the air pollutant is a volatile organic compound selected from the group consisting of formaldehyde, benzene, toluene, xylene, para-dichlorobenzene, ethyl benzene, styrene, acetaldehyde, cyclohexanone, isophorone, methanol, ethanol, phenol, acetone, ethyl acetate, n-butanol, methyl isobutyl ketone, n-butyl acetate, acetophenone, methyl ethyl ketone, isopropyl alcohol, dichloromethane, trichloroethylene, n-hexane, 2-methoxylethyl acetate, nitrobenzene, bis-(2-methyoxyethyl)ether, 1,3,5-trimethylbenzene, and mixtures thereof.

2. The composition of claim 1, wherein the plant-derived substance is about 1 to about 30 wt % of the composition.

3. The composition of claim 1, wherein the amount of the one or more dispersants is about 0.01 to about 10 wt % of the composition.

4. The composition of claim 1, wherein the at least one plant derived substance is a plant polyphenol.

5. The composition of claim 4, wherein the plant polyphenol is selected from the group consisting of tannins, lignins, flavonoids, tea polyphenol, phenolic compounds, carvacrol, eugenol, and mixtures thereof.

6. The composition of claim 4, wherein the polyphenol is present in an amount of about 1 to about 30 wt % of the composition.

7. The composition of claim 1, further comprising at least one photocatalyst and at least one chemical scavenger.

8. The composition of claim 7, wherein the photocatalyst is a nanomaterial selected from the group consisting of titania, nano-titania, zinc oxide, tin oxide, silver anatase, titanium dioxide, zirconium phosphate, silver zirconium phosphate, tungsten trioxide, manganese dioxide, and combinations thereof.

9. The composition of claim 7, wherein the chemical scavenger is selected from the group consisting of semicarbazide, hydrazine, phenylhydrazine, ammonium sulfate, D-glucosamine hydrochloride, tromethamine, taurine, alanine, glutamic acid, 2-imidazolidinone, adipic acid dihydrazide, p-toluenesulfonyl hydrazide, 1,3-diaminourea, 3,6-dihydroxypyridazine, tris(2-hydroxyethyl)amine, triethylenediamine, and mixtures thereof.

10. The composition of claim 7, wherein the photocatalyst is present in an amount of about 1 to about 30 wt % of the composition.

11. The composition of claim 7, wherein the chemical scavenger is present in an amount of about 1 to about 30 wt % of the composition.

12. A composition for removing air pollutants, comprising:
    a plant pectinase in an amount of about 1 to about 5 wt % of the composition;
    sodium carboxymethyl cellulose in an amount of about 1 to about 10 wt % of the composition;
    hemicellulose in an amount of about 1 to about 10 wt % of the composition; and
    water.

13. A composition for removing air pollutants, comprising:
    a tea polyphenol in an amount of about 1 to about 5 wt % of the composition;
    polyethylene oxide-propylene oxide in an amount of about 1 to 10 about wt % of the composition;
    nano-titania in an amount of about 1 to about 10 wt % of the composition;
    ammonium sulfate in an amount of about 1 to about 10 wt % of the composition; and
    water.

14. A method of removing one or more air pollutants from air, comprising:
    contacting the composition of claim 1 with air.

15. An apparatus for removing one or more air pollutants from air, the device comprising the composition of claim 1.

16. The composition of claim 4, wherein the plant polyphenol is a tea polyphenol.

17. The composition of claim 7, wherein the photocatalyst is nano-titania.

18. The composition of claim 7, wherein the chemical scavenger is ammonium sulfate.

19. The composition of claim 7, wherein the chemical scavenger reacts with an aldehyde or ketone functional group in the air pollutant.

* * * * *